(12) United States Patent
Lee

(10) Patent No.: US 7,843,404 B2
(45) Date of Patent: Nov. 30, 2010

(54) SMART MIRROR APPARATUS USING LCD PANEL

(75) Inventor: Jong Cheon Lee, Gwangju (KR)

(73) Assignee: Sody, Gwangju (KR)

( * ) Notice: Subject to any disclaimer, the term of this patent is extended or adjusted under 35 U.S.C. 154(b) by 736 days.

(21) Appl. No.: 11/895,617

(22) Filed: Aug. 23, 2007

(65) Prior Publication Data

US 2008/0074606 A1  Mar. 27, 2008

Related U.S. Application Data

(63) Continuation of application No. PCT/KR2006/000628, filed on Feb. 23, 2006.

(30) Foreign Application Priority Data

Feb. 23, 2005  (KR) .................. 10-2005-0014867

(51) Int. Cl.
G09G 3/00 (2006.01)
(52) U.S. Cl. ............... 345/32; 345/48; 345/51; 345/87; 345/105; 349/195; 349/199; 349/202; 340/438; 340/461; 359/256; 359/267; 359/487
(58) Field of Classification Search ........ 345/7, 345/8, 32, 48–52, 87, 92, 105; 349/195, 349/199–202; 359/256, 263, 267, 487; 340/438, 340/461, 465, 469
See application file for complete search history.

(56) References Cited

U.S. PATENT DOCUMENTS

| 4,676,601 | A | 6/1987 | Itoh et al. |
| 4,902,108 | A | 2/1990 | Byker |
| 5,204,778 | A | 4/1993 | Bechtel |
| 5,278,693 | A | 1/1994 | Theiste et al. |
| 5,280,380 | A | 1/1994 | Byker |
| 5,282,077 | A | 1/1994 | Byker |

(Continued)

FOREIGN PATENT DOCUMENTS

JP  61-219934 A  9/1986

(Continued)

OTHER PUBLICATIONS pct/kr2006/0006289 International Search Report, Mar. 13, 2006.

*Primary Examiner*—Henry N Tran
(74) *Attorney, Agent, or Firm*—Kevin D. Jablonski; Graybeal Jackson LLP

(57) ABSTRACT

The present invention provides a smart mirror apparatus using an LCD panel. The smart mirror of the present invention includes a reflective mirror, which is provided in the vehicle, and an LCD panel, which is placed in a light path between the reflective mirror and eyes of the driver and has one or two polarizing sheets. The smart mirror further includes an incident light detecting unit, which detects both the brightness of the incident light transmitted from the rear to the LCD panel and the brightness around the LCD panel, and calculates a difference value therebetween. The smart mirror further includes a voltage determination unit, which receives the calculated difference value and determines the drive voltage depending on the difference value, and a voltage apply and supply unit which applies the drive voltage, determined by the voltage determination unit, to the LCD panel.

14 Claims, 3 Drawing Sheets

U.S. PATENT DOCUMENTS

| | | | |
|---|---|---|---|
| 5,448,397 A | 9/1995 | Tonar | |
| 5,451,822 A | 9/1995 | Bechtel et al. | |
| 6,118,420 A * | 9/2000 | Yamamoto et al. | 345/87 |
| 6,512,624 B2 | 1/2003 | Tonar et al. | |
| 6,700,692 B2 * | 3/2004 | Tonar et al. | 359/265 |
| 7,526,103 B2 * | 4/2009 | Schofield et al. | 382/104 |
| 7,579,939 B2 * | 8/2009 | Schofield et al. | 340/425.5 |
| 7,586,666 B2 * | 9/2009 | McCabe et al. | 359/265 |
| 2005/0185278 A1 * | 8/2005 | Horsten et al. | 359/487 |

FOREIGN PATENT DOCUMENTS

| | | |
|---|---|---|
| KR | 2003-0091898 A | 12/2003 |

* cited by examiner

SMART MIRROR APPARATUS USING LCD PANEL

CROSS-REFERENCE TO RELATED APPLICATION

This is a continuation application that claims benefit, under 35 USC §120, of co-pending International Application PCT/KR2006/000628, filed 23 Feb. 2006, designating the United States, and that claims foreign priority benefits under 35 USC §119(a) to Korean Patent Application No. 2005-0014867 filed 23 Feb. 2005, both of which are incorporated herein by reference.

TECHNICAL FIELD

The present invention relates to a smart mirror apparatus using an LCD panel, which adjusts the reflectance of an inside rear view mirror or a side rear view mirror of a vehicle, thus protecting the eyesight of a driver of the vehicle from strong light emitted from behind the vehicle at night, and preventing the light from dazzling the driver.

BACKGROUND ART

Conventional electric mirrors for vehicles mainly use an ECM (electrochromic material) technology. This technology was made well known through U.S. Pat. No. 4,902,108, U.S. Pat. No. 5,204,778, U.S. Pat. No. 5,278,693, U.S. Pat. No. 5,280,380, U.S. Pat. No. 5,282,077, U.S. Pat. No. 5,448,397, U.S. Pat. No. 5,451,822, U.S. Pat. No. 6,512,624, etc. This technology has been commercialized at present, and products using it have been applied to several million vehicles.

Furthermore, an electric mirror for vehicles using an LCD was proposed in U.S. Pat. No. 4,676,601. The critical points of this patent are limited to a light sensing technique and a technique of determining whether to operate the LCD.

To date, most commercialized electric mirrors for vehicles are products using the ECM technology, but electric mirrors using LCDs are not yet commercialized. However, conventional ECM rear view mirrors, which have been produced, have a slow response speed in a range from 3 to 6 seconds and relatively high power consumption of several hundreds of mA. In the case of LCD mirrors, because a polarizing sheet is used, reduction in light reflectance due to light absorption always occurs. Therefore, because the mirror is slightly dark even when not in operation, there is difficulty applying it to a mirror for vehicles.

Generally, a polarization rate P(%) of a polarizing sheet is explained by the equation $P=100\times(T1-T2)/(T1+T2)$. In this equation, T1 denotes light transmissivity of the polarization sheet when the vibration direction of incident light is parallel with the polarization axis of the polarization sheet, and T2 denotes light transmissivity of the polarization sheet when the vibration direction of incident light is perpendicular to the polarization axis of the polarization sheet.

Typically, polarizing sheets used in TFT (thin film transistor) LCDs or STN (super twisted nematic) LDCs have a polarization rate of 95% or more in the visible light band and light transmissivity in the range from 38% to 45%. In the case of the TFT LCDs or STN LCDs manufactured using such polarizing sheets, a contrast ratio, which is the ratio of the luminance between the brightest state and the darkest state, ranges from 20:1 to 1000:1. In the case of an LCD mirror manufactured by coupling such an LCD panel to a reflective plate, due to the difference in luminance between the brightest state and darkest state of a polarizing sheet, when in a dark state, the mirror becomes excessively dark, and, even when in a bright state, the mirror is relatively dark, having light reflectance of approximately 25%. Hence, this LCD mirror is not suitable for rear view mirrors for vehicles.

In the case of a 'Guest-Host LCD Mode', which uses no polarizing sheet or only one polarizing sheet, the brightness thereof varies greatly depending on the viewing angle. Furthermore, even when in operation, because the light cut rate thereof is only approximately 8%, it is insufficient to prevent the driver from being dazzled. Furthermore, because the dyeing material used as the 'Guest' is not reliable with respect to ultraviolet rays, it is not suitable for rear view mirrors for vehicles.

TECHNICAL PROBLEM

Accordingly, the present invention has been made keeping in mind the above problems occurring in the prior art, and an object of the present invention is to provide a smart mirror apparatus using an LCD panel, in which the response speed of the reflectance thereof, depending on the quantity of incident light, is rapid, and which reduces power consumption.

TECHNICAL SOLUTION

In order to accomplish the above object, the present invention provides a smart mirror apparatus to prevent light transmitted from behind a vehicle from dazzling a driver of the vehicle, comprising:

a reflective mirror provided in the vehicle;

an LCD panel placed in a light path between the reflective mirror and eyes of the driver, and comprising one or two polarizing sheets, each having a polarization rate ranging from 50% to 95% in a visible light band, the LCD panel varying a light transmissivity thereof depending on a magnitude of voltage applied to the LCD panel, thus adjusting a quantity of light that reaches the driver after being reflected by the reflective mirror;

an incident light detecting unit detecting both brightness of the incident light transmitted from behind the vehicle to the LCD panel and brightness around the LCD panel, and calculating a difference value therebetween;

a voltage determination unit receiving the difference value calculated by the incident light detecting unit and determining the drive voltage depending on the difference value; and a voltage apply and supply unit to apply the drive voltage determined by the voltage determination unit to the LCD panel.

ADVANTAGEOUS EFFECTS

The present invention has the following effects.

First, the response speed of an LCD mirror of the present invention is 0.3 seconds or less, which is at least 10 times faster than the conventional ECM rear view mirror.

Second, the light reflectance of the LCD mirror of the present invention, when in a bright state, is 40% or more and is increased by 60% or more compared to the conventional LCD mirror using polarizing sheets.

Third, because a portable battery may be used as the power source, a separate wire for connecting it to the vehicle is not required. Therefore, installation of the LCD mirror and a process of replacing it are simplified.

Fourth, the light reflectance and response speed of the mirror are adjustable thanks to the rapid response speed of the LCD and the existence of intermediate gradations. Therefore, a phenomenon of dazzling the driver can be minimized.

Fifth, depending on the characteristics of the polarizing sheet, the range of light reflectance can be arbitrarily adjusted within the visible light wavelength band.

BEST MODE

Hereinafter, preferred embodiments of the present invention will be described in detail with reference to the attached drawings.

Figure 1:
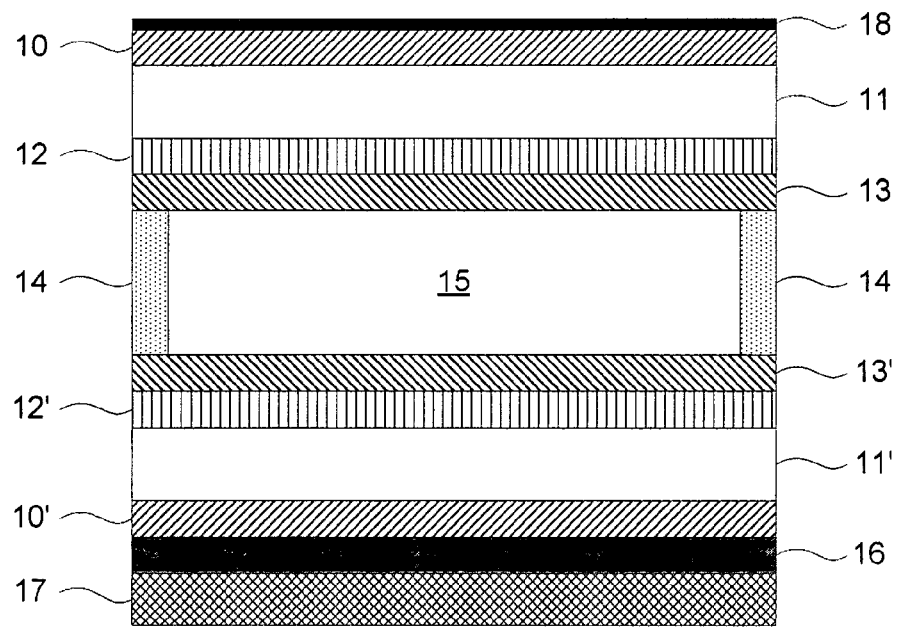
FIG. 1 is a sectional view showing an LCD mirror constituting a smart mirror apparatus, according to a first embodiment of the present invention.

FIG. 1 is a sectional view showing an LCD mirror constituting a smart mirror apparatus, according to the first embodiment of the present invention. The LCD mirror includes an LCD panel. This LCD panel includes polarizing sheets 10 and 10', transparent sheets 11 and 11', transparent electrode layers 12 and 12', orientation layers 13 and 13', a sealant 14, and a liquid crystal layer 15. The LCD panel has a structure in which the polarizing sheet 10, the transparent sheet 11, the transparent electrode layer 12, the orientation layer 13, the liquid crystal layer 15 and the sealant 14, the orientation layer 13', the transparent electrode layer 12', the transparent sheet 11 and the polarizing sheet 10' are consecutively laminated from the outside to the inside.

Figure 6:
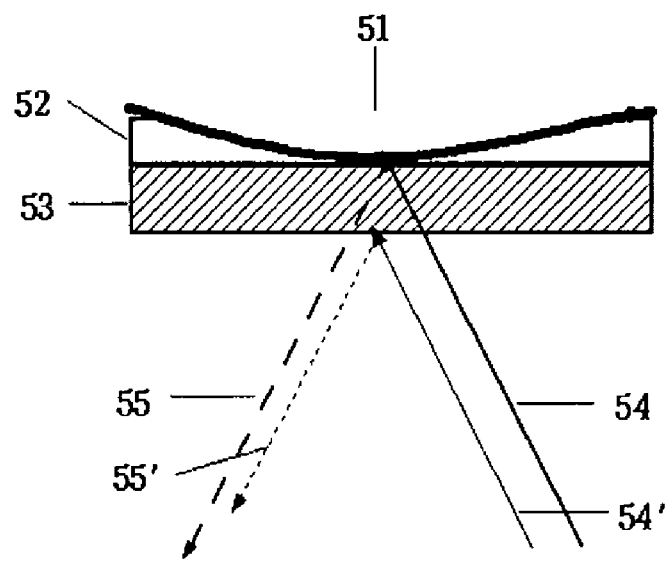
FIG. 6 is a view showing an example of application of the LCD mirror of the first embodiment of FIG. 1 to a rear view mirror for vehicles.

The polarizing sheet 10', which is disposed inside the LCD panel, is attached to a typical rear view mirror of a vehicle using a hardening agent, so that the LCD mirror further includes a hardening agent layer 16 and a reflective mirror 17. The outside surface of the polarizing sheet 10 is coated with a nonreflecting layer 18. An example of application of the LCD mirror of the first embodiment of FIG. 1 to a rear view mirror for vehicles is shown in FIG. 6.

Each polarizing sheet 10, 10' absorbs light, which vibrates in a direction parallel with a polarization axis. The average degree of polarization within a visible light band range is from 50% to 95%. The polarization axis of the polarizing sheet 10 is perpendicular to the polarization axis of the polarizing sheet 10. One of the polarizing sheets 10 and 10' may be removed. Because the polarizing sheet 10 of the LCD panel is disposed at the outermost position, a UV coating layer may be applied to the surface thereof to prevent scratches, or, alternatively, a transparent plastic substrate or a thin glass substrate, which has a high hardness and serves as a protective layer, may be attached to the surface of the polarizing sheet 10. In this embodiment, the nonreflecting layer 18 is applied to the outside surface of the polarizing sheet 10. As such, in the case that the polarizing sheet 10 is coated with the nonreflecting layer 18, the surface reflectance thereof is reduced to approximately 0.5%, and the surface hardness thereof is increased to a range from 2H to 2.5H, thus preventing scratches.

Here, the visible light band means that the wavelength of light ranges from 430 nm to 780 nm. The degree of polarization and the light transmissivity of a typical polarizing sheet are almost constant regardless of the wavelength of light, but, in the case of a color polarizing sheet, the degree of polarization and the light transmissivity thereof are changed depending on the wavelength of light.

Both a typical polarizing sheet and a color polarizing sheet can be applied to the present invention. When using the typical polarizing sheet, the present invention has a light reflectance adjustment property that is almost constant throughout the entire visible light band regardless of the color of a headlight of a vehicle. Meanwhile, when using the color polarizing sheet, the present invention can control light reflectance more strongly in response to light of a headlight having a specific wavelength. For example, if a red light polarizing sheet is used, reflectance of a red headlight can be controlled more strongly. That is, light, which has a wavelength range shorter than the red light, is transmitted through the polarizing sheet, so that a driver can more clearly see peripheral objects, other than the headlight of the following vehicle, without being dazzled. As such, if the color of the polarizing sheet is selected in consideration of the wavelength range of headlights of vehicles, the present invention can efficiently control light emitted from headlights of following vehicles and makes it possible for the driver to more clearly see other objects while driving.

Each transparent sheet 11, 11' is a glass or plastic substrate, which is planar and transparent. When using an easily bendable plastic substrate, a planar and transparent glass sheet is preferably attached so as to maintain constant flatness and curvature thereof.

Each transparent electrode layer 12, 12' is formed by applying ITO (indium tin oxide) onto a glass substrate or a plastic substrate to a thickness of 3000 Å or less, and particularly, to a thickness of approximately 1500 Å. When a potential difference is applied to the upper and lower transparent electrode layers 12 and 12', an electric field is formed in the liquid crystal layer 15, thereby the LCD panel is operated.

The orientation layers 13 and 13' serve to orient liquid crystal molecules of the liquid crystal layer 15 in a desired direction, and are formed by applying macromolecular PI to a thickness of 3000 Å or less, in particular, to a thickness of approximately 1000 Å. Each orientation layer 13, 13' realizes vertical orientation, horizontal orientation, or oblique orientation, depending on the orientation type of the liquid crystal molecules of the liquid crystal layer 15.

The sealant 14 serves as a fence such that the liquid crystal of the liquid crystal layer 15 is confined in a defined space and serves to attach the transparent sheets 11, which are disposed on opposite sides of the liquid crystal layer 15, to each other.

The liquid crystal layer 15 has a thickness of several μm and is configured as a TN (twisted nematic) mode, an ECB (electrically controllable birefringence) mode, or a VA (vertically aligned) mode.

The hardening agent layer 16 is made of transparent thermosetting resin or UV-setting resin, and bonds the LCD panel to the reflective mirror 17. It is configured such that the refractive index of the hardening agent layer 16 is similar to that of the transparent glass substrate or the plastic substrate, thus minimizing internal reflections occurring at the boundary between different substances. Preferably, the refractive index of the transparent hardening agent in the visible light band is within a range from 1.40 to 1.55.

The reflective mirror 17 is a typical inside rear view mirror or side rear view mirror and is manufactured by forming a thin metal film, such as aluminum, chrome or silver film, on a plastic substrate or a glass substrate.

The hardening agent layer 16 and the reflective mirror 17 reinforce the flatness and strength of the entire mirror.

In the LCD mirror having the above-mentioned construction, the path of light is progressively presented below.

Incident light enters the polarizing sheet 10 and passes through the liquid crystal layer 15, the polarizing sheet 10', and the hardening agent layer 16. Subsequently, the incident light is reflected from the reflective mirror 17 towards the polarizing sheet 10.

The polarization axes of the polarizing sheets 10 and 10' are angled at 90°.

If no drive voltage is applied to the liquid crystal layer 15, the incident light, having passed through the polarizing sheet 10, is elliptically polarized, and the polarization axis thereof is rotated at 90° while passing through the liquid crystal layer 15. Therefore, the light can pass through the polarizing sheet 10'. The light, having passed through the polarizing sheet 10', is reflected from the reflective mirror 17 after passing through the hardening agent layer 16. Subsequently, the light is polarized by the polarizing sheet 10'. While the light passes through the liquid crystal layer 15, the polarization axis thereof is rotated at 90°. Thereafter, the light goes out through the polarizing sheet 10.

When sufficient drive voltage is applied to the liquid crystal layer 15 through the transparent electrode layers 12 and 12', the liquid crystal molecules of the liquid crystal layer 15 are rearranged. In this state, if polarized light enters the liquid crystal layer, the light passes through the liquid crystal layer while maintaining its state, when entering the liquid crystal layer, without rotation of the polarization axis thereof. Therefore, a large amount of light, which has been polarized by the polarizing sheet 10, is absorbed by the polarizing sheet 10' while passing through it. In addition, a large amount of light, which has been polarized by the polarizing sheet 10', is absorbed by the polarizing sheet 10 while passing through it. As a result, the reflectance of the LCD mirror is relatively reduced.

Figure 2:
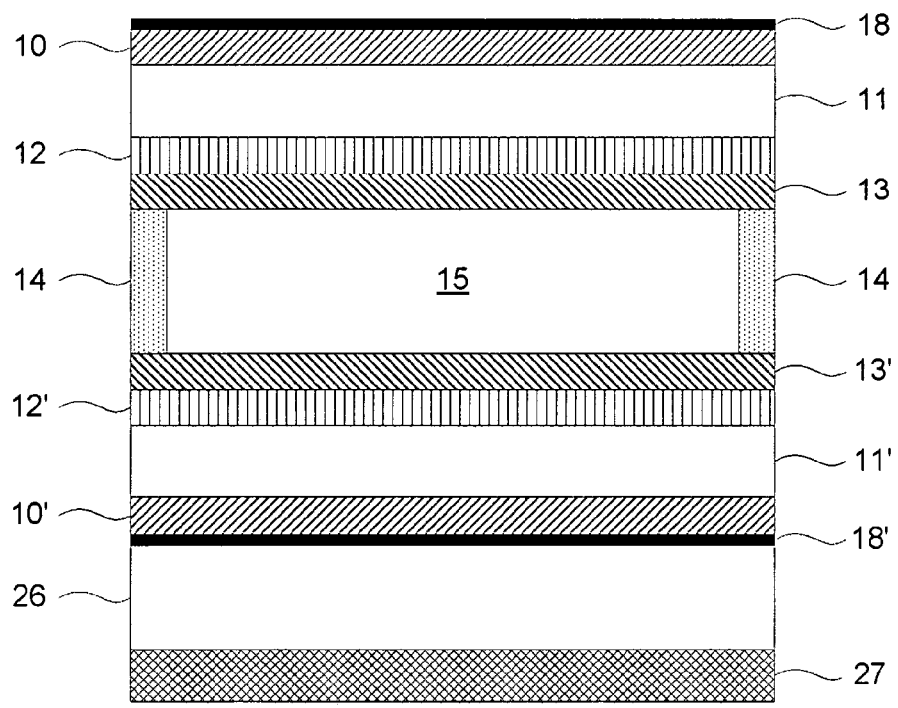
FIG. 2 is a sectional view showing an LCD mirror constituting a smart mirror apparatus, according to a second embodiment of the present invention.
Figure 7:
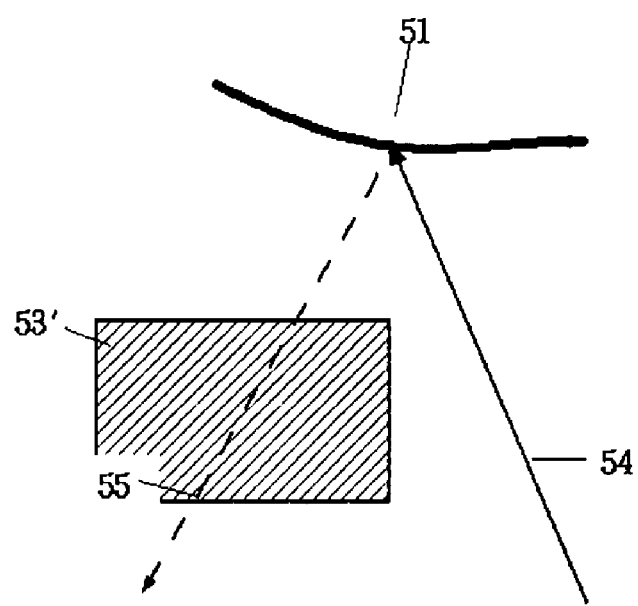
FIG. 7 is a view showing an example of application of the LCD mirror of the second embodiment of FIG. 2 to a rear view mirror for vehicles.

FIG. 2 is a sectional view showing an LCD mirror constituting a smart mirror apparatus, according to a second embodiment of the present invention. In this embodiment, an LCD panel, in which nonreflecting layers 18 and 18' are applied to opposite sides thereof, is disposed at a position spaced apart from a reflective mirror 27 by a predetermined distance, unlike the first embodiment, in which the LCD panel is attached to the reflective mirror using a hardening agent. An example of application of the LCD mirror of the second embodiment of FIG. 2 to a rear view mirror for vehicles is shown in FIG. 7.

The LCD panel according to the this embodiment includes polarizing sheets 10 and 10', transparent sheets 11 and 11', transparent electrode layers 12 and 12', orientation layers 13 and 13', a sealant 14, and a liquid crystal layer 15. The laminated structure of the LCD panel is equal to that of the LCD panel of the first embodiment. Furthermore, the functions of the elements of the LCD panel of FIG. 2 are equal to those of the LCD panel of FIG. 1, therefore further explanation is deemed unnecessary.

In the drawing, the LCD panel is shown as being coaxially attached to a reflective mirror through a transparent layer 26, but, actually, the LCD panel may be separately disposed from the reflective mirror 27, and an air layer or inert gas layer may form the transparent layer 26. In other words, the LCD panel and the reflective mirror 27 may not be coaxially disposed, so long as the LCD panel is placed in a light path between the reflective mirror 27 and the eyes of the driver so as to control the transmissivity of light reflected by the reflective mirror 27 towards the driver.

The light transmissivity of each polarizing sheet 10, 10' is maximized when no voltage is applied to the liquid crystal layer 15.

In the light path of the LCD mirror having the above-mentioned construction, there are two paths, including a first path, along which incident light, which is transmitted from the rear, passes through the LCD panel, is reflected from the reflective mirror, and reaches the driver after passing again through the LCD panel, and a second path, along which incident light, which is transmitted from the rear, is directly reflected from the reflective mirror without passing through the LCD panel and, thereafter, reaches the driver after passing through the LCD panel.

The first path is the same as the light progressive path of the LCD mirror of FIG. 1, in which incident light, which is transmitted from the rear, passes through the LCD panel two times before reaching the driver. In the case of the second path, incident light, which is transmitted from the rear, is directly reflected from the reflective mirror 27 and reaches the driver after passing through the LCD panel once.

When no drive voltage is applied to the liquid crystal layer 15, light, which is reflected from the reflective mirror 27, passes through the nonreflecting layer 18' and is elliptically polarized by the polarizing sheet 10'. Thereafter, the light rotates the polarization axis thereof at 90° while passing through the liquid crystal layer 15, and goes out through the polarizing sheet 10 and the nonreflecting layer 18. Meanwhile, if sufficient voltage is applied to the liquid crystal layer 15 through the transparent electrode layers 12 and 12', light, which has been reflected from the reflective mirror 27 and has passed through the nonreflecting layer 18', and has been elliptically polarized by the polarizing sheet 10', passes through the liquid crystal layer 15, the liquid crystal molecules of which have been rearranged, without changing its state. Therefore, a large amount of light, which has passed through the liquid crystal layer 15, is absorbed by the polarizing sheet 10 before going out through the nonreflecting layer 18. As a result, the reflectance of the LCD mirror is relatively reduced.

Figure 3:
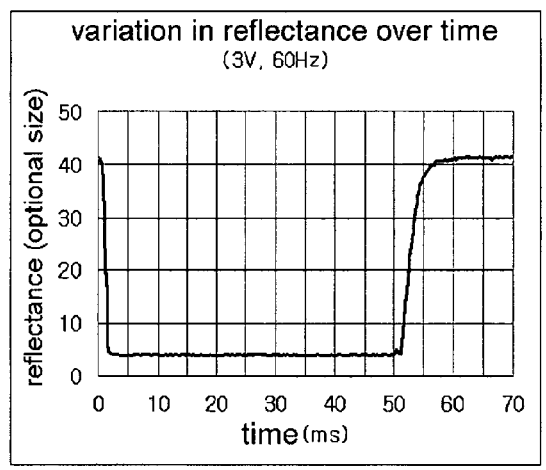
FIG. 3 is a graph showing reflectance as a function of time for the LCD mirror, when electricity is abruptly applied to and removed from a liquid crystal layer of an LCD panel.

FIG. 3 is a graph showing reflectance as a function of time for the LCD mirror, when electricity is abruptly applied to and removed from the liquid crystal layer of the LCD panel. In an initial state, in which no voltage is applied (applied voltage of 0 volts), the reflectance of the mirror is approximately 41%. When alternating current voltage of 60 Hz and 3 volts is applied, approximately 2 ms after the moment that the voltage is applied, the reflectance is reduced to approximately 4%. Thereafter, when applied voltage is removed at a moment approximately 50 ms after the initial time, the reflectance is returned to 41% after approximately 6 ms.

Figure 4:
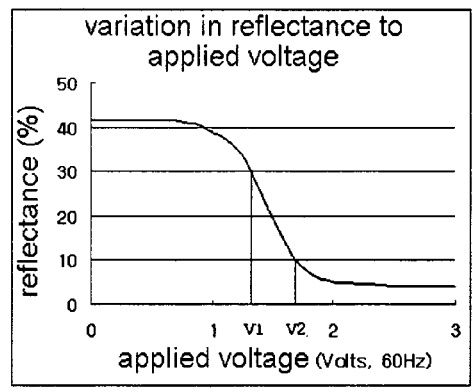
FIG. 4 is a graph showing reflectance as a function of time for the LCD mirror, when alternating current voltage of 60 Hz is applied to the liquid crystal layer of the LCD panel while increasing from 0 volts to 3 volts.

FIG. 4 is a graph showing reflectance as a function of time for the LCD mirror, when alternating current voltage of 60 Hz is applied to the liquid crystal layer of the LCD panel while being increased from 0 volts to 3 volts. Even if voltage is applied to the liquid crystal layer while being decreased from 3 volts to 0 volts, a similar result is obtained. In an initial state, that is, when 0 volts are applied, the reflectance of the mirror is approximately 41%. At voltage of V1, which is between 0 volts and 3 volts, the reflectance thereof is 30%. At voltage of V2, the reflectance thereof is 10%. At 3 volts, the reflectance thereof is 4%. As such, when voltage, which is arbitrarily selected between 0 volt and 3 volts, is applied to the liquid crystal layer, corresponding reflectance of the mirror is obtained. Furthermore, while voltage applied to the liquid crystal layer is changed from the initial voltage to the final voltage, the reflectance of the mirror varies in consideration of the response speed of the liquid crystal.

Figure 5:
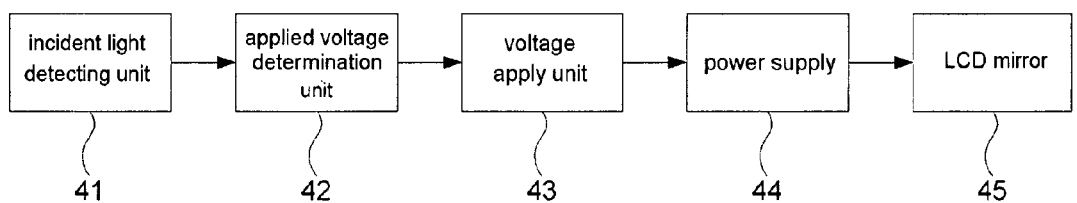
FIG. 5 is a functional block diagram of the smart mirror apparatus according to the present invention.

FIG. 5 is a functional block diagram of the smart mirror apparatus according to the present invention.

The smart mirror apparatus of the present invention includes an incident light detecting unit 41, a voltage determination unit 42, a voltage apply unit 43, a power supply 44 and an LCD mirror 45.

The incident light detecting unit 41 includes a plurality of semiconductor light sensors and respectively detects light transmitted to the LCD mirror from behind the vehicle, and light present around the LCD mirror.

A CdS cell is mainly used as each semiconductor light sensor. The CdS cell outputs a resistance value depending on the amount of incident light in the visible light band. That is, as the amount of incident light is increased, the internal resistance value is reduced. Therefore, the resistance value of each semiconductor light sensor is determined by the amount of light transmitted in a corresponding direction. Thus, the brightness difference between the front and the rear can be determined by the difference in resistance values between the semiconductor light sensors.

The voltage determination unit 42 analyzes both the brightness of incident light transmitted from the rear and the brightness of peripheral light, both detected by the semiconductor light sensors of the incident light detecting unit 41. Therefore, the voltage determination unit 42 determines both whether the rear incident light is dazzling the driver and the degree of dazzle. Subsequently, the voltage determination unit 42 determines whether to apply voltage to the LCD panel constituting the LCD mirror 45. If the brightness of the incident light, which is transmitted from behind the vehicle, is high enough to dazzle the driver, sufficient drive voltage is applied to the LCD panel to reduce the light reflectance of the LCD mirror 45.

That is, if the brightness of the incident light, which is transmitted from behind the vehicle, is high enough to dazzle the driver, the voltage supply 44 is operated to apply sufficient drive voltage to the LCD panel and reduce the light reflectance of the LCD mirror 45. Meanwhile, if the area around the LCD mirror is brighter than incident light transmitted from the rear, so that the light reflected by the LCD mirror 45 is not dazzling the driver, no voltage is applied to the liquid crystal layer of the LCD mirror. For example, during the bright daytime, even if a following vehicle approaches while its high beams are operating, the apparatus determines that the driver is not dazzled.

As shown in FIG. 4, the light transmissivity of the LCD mirror may have intermediate gradations depending on applied voltage. Furthermore, the LCD mirror can respond such that the light transmissivity thereof is appropriately adjusted within a short time, 3 ms, depending on the degree and rate of variation in the peripheral brightness of the LCD mirror or in the brightness of rear incident light which is detected by the semiconductor light sensors. Meanwhile, if the driver is severely dazzled because high beams of a following vehicle are abruptly turned on, the light reflectance of the LCD mirror is rapidly decreased. In the case that a rear vehicle gradually approaches, the light reflectance of the LCD mirror is gradually decreased through several intermediate gradations depending on the degree of dazzle. Furthermore, in the case that the rear vehicle abruptly turns off its high beams, which have been turned on, in the case that the following vehicle with headlights turned on is shaken by uneven ground, or in the case that the rear vehicle abruptly vanishes from sight, if the response speed of the LCD mirror is excessively quick, the light reflectance of the LCD mirror is rapidly increased, so that the driver may be dazzled. To prevent this, the LCD mirror is constructed such that the light reflectance thereof is gradually increased. In a variety of conditions, recognition of resistance values of the semiconductor light sensors, determination of whether voltage must be applied to the liquid crystal layer 15, and the method of applying voltage are implemented using a CPU (central processing unit), which is provided in the voltage determination unit 42.

The voltage apply unit 43 controls the power supply 44 such that voltage having a magnitude determined by the voltage determination unit 42 is supplied to the transparent electrode layers in the LCD mirror 45. Depending on the magnitude of voltage applied to the transparent electrode layers, the degree of orientation of the liquid crystal layer 15 varies. Thereby, the light reflectance of the LCD mirror 45 is changed. The light reflectance of the LCD mirror 45 is determined by average voltage applied to the liquid crystal layer 15. As methods for adjusting the average voltage, there is a method of adjusting the average voltage by changing the amplitude of alternating current voltage while maintaining the frequency thereof constant, and a method of adjusting the average voltage by changing the frequency or voltage apply time while maintaining the amplitude.

In the present invention, the required drive voltage of the LCD mirror 45 is 3 volts or less, that is, very low. Therefore, a portable battery may be used as a power source. In this case, it is unnecessary to connect the mirror apparatus to the power source of the vehicle through a separate process. Thus, installation and removal of the electric mirror of the present invention are simplified. A primary battery, such as an alkaline battery, may be used alone as the portable battery, or it may be used along with a solar battery or a secondary battery (a rechargeable battery). Of course, the power source of the vehicle may be used.

For example, a sample of a rear view mirror manufactured according to the present invention is presented below.

The transparent sheet 11 was manufactured using transparent glass (produced by Samsung Corning Precision Glass Co., Ltd.), which had a thickness of 0.7 mm and was coated with ITO having a surface resistance of 80 Ω/square. A LCD mirror was manufactured in a size of 265×65 mm.

Each orientation layer 13, 13' was manufactured by applying polymer, for example, a PI (polyimide) film (trade name: SE 150) to approximately 1000 Å and by thermal-hardening it, and the liquid crystal orientation thereof was adjusted by rubbing it using a soft fabric. The orientation layer 13, which was disposed at a light entrance side, and the orientation layer 13', which was disposed on the opposite side of the liquid crystal layer from the orientation layer 13, were rubbed in directions perpendicular to each other, that is, at 90°.

The liquid crystal layer 15 was formed using a 90° TN liquid crystal, and the thickness thereof was controlled using a spacer having a regular rectangular hole and a thickness of 5.5 μm.

The polarizing sheet 10 was oriented such that the polarization axis thereof was parallel with the direction in which the orientation layer 13, which was disposed at a light entrance side, was rubbed. A polarizing sheet having a polarization rate of 63% was used. the average light transmissivity of the two parallel polarizing sheets was 46%. The polarizing sheet had an almost constant polarization characteristic throughout the entire visible light band.

The polarizing sheet 10' had the same characteristic as the polarizing sheet 10 and was oriented such that the polarization axis thereof was perpendicular to the polarization axis of the polarizing sheet 10.

The reflective mirror 17 was manufactured by applying a reflecting layer to an outer surface of a glass mirror having a thickness of 1.0 mm. The reflective mirror 17 was bonded to the LCD panel using the hardening agent layer 16 (a UV hardening agent having a refractive index of 1.5).

Two AAA alkaline batteries, each of which output 1.5V, were used in a series connection, such that the drive voltage of the LCD mirror was 3V. A semiconductor light sensor was disposed at each of the front and rear sides of the LCD mirror, so that, only when relatively bright light was detected by the semiconductor light sensor disposed towards the rear, was voltage of 3V applied to the LCD.

The test was conducted using this LCD mirror. As shown in FIG. 3, when no electric field was applied to the LCD mirror, light reflectance thereof was 41%, which is the maximum value. When an electric field was applied to the LCD mirror, light reflectance thereof was reduced to 4%. Here, the time required for conversion from the bright state to the dark state was 2 ms. Conversely, the time required for conversion from the dark state to the bright state was 6 ms. The power consumption of the entire LCD mirror assembly was 5 mA or less, so that it is reasonable for the LCD mirror to use the power source of the vehicle. In the case of using an economical circuit, the power consumption is reduced to 1 mA or less, so that a typical battery can be used as the power source.

FIG. 6 is a view showing a product which is manufactured by integrally coupling an anti-dazzle LCD panel 53 to a typical rear view mirror 51 of a vehicle using a hardening agent.

The construction of the product of FIG. 6 is equal to that of FIG. 1. The reflective mirror 17 of FIG. 1 and the rear view mirror 51 are elements corresponding to each other and are planar mirrors or convex mirrors. A hardening agent layer 52 is formed by a hardening agent between the LCD panel 53 and the rear view mirror 51. This hardening agent layer 52 corresponds to the hardening agent layer 16 of FIG. 1.

In the drawing, an incident light 54 (light which is transmitted from the rear of the vehicle and reaches the surface of the mirror after passing through the LCD panel) passes through the LCD panel 53, is reflected from the rear view mirror 51, and, thereafter, passes through the LCD panel 53 before reaching the driver. As such, the incident light passes through the LCD panel 53 two times.

The hardening agent layer 52 is formed by transparent adhesive or material having a refractive index similar to that of glass, so as to minimize internal reflection. A nonreflecting layer 18 is applied to the outermost surface of the LCD panel 53 in the same manner as that of FIG. 1, thus minimizing the quantity of reflected light 55' (light that reaches the driver after being reflected by the nonreflecting layer 18) of the incident light 54' (light which reaches the LCD panel from behind the vehicle), which is reflected by the outermost surface of the LCD panel 53.

If the quantity of surface reflected light 55' is similar to the quantity of mirror reflected light 55, the lights, which are reflected by two surfaces, form a twin image. In other words, a twin image is formed by the surface reflected light 55', which is reflected by the nonreflecting layer 18 that forms the outermost surface of the LCD panel 53, together with the mirror reflected light 55, which is reflected by the surface of the rear view mirror 51. Generally, the quantity of light, which is reflected by the surface of a polarizing sheet of an LCD panel, is approximately 4% in the visible light band. However, in the case that the nonreflecting layer is applied to the LCD panel in the same manner as that of the present invention, the reflectance thereof is reduced to a range from 0.5% to 1%. Therefore, the twin image phenomenon is markedly mitigated.

FIG. 7 is a view showing an installed state such that an anti-dazzle LCD panel 53' is spaced apart from a typical rear view mirror 51 of a vehicle by a predetermined distance. The construction of the product of FIG. 7 is equal to that of FIG. 2. The reflective mirror 27 of FIG. 2 and the rear view mirror 51 are elements corresponding to each other, and are planar mirrors or convex mirrors. In the case that the rear view mirror 51 is used as a side rear view mirror, it is disposed outside the vehicle. In the case that the rear view mirror 51 is used as an inside rear view mirror, it is disposed inside the vehicle. The LCD panel 53' may be disposed inside the vehicle regardless of the position of the rear view mirror 51, so long as the LCD panel 53' is placed in a light path connecting the rear view mirror with the eyes of the driver.

In the drawing, incident light 54 (light which is transmitted from the rear of the vehicle and reaches the rear view mirror 51) is directly reflected from the rear view mirror 51, and reaches the driver after passing through the LCD panel 53'. In this case, nonreflecting layers 18 and 18' are applied to the respective opposite surfaces of the LCD panel 53' to prevent reflected light 55 from being reflected by the opposite surfaces of the LCD panel 53'. That is, it is constructed such that the amount of light that is reflected by the LCD panel 53' when the light enters the LCD panel 53' after being reflected from the rear view mirror 51 is minimized and the internal reflectance of the LCD panel 53' is minimized, thus maximizing the amount of light 55 that passes through the LCD panel 53'.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A smart mirror apparatus to prevent light transmitted from behind a vehicle from dazzling a driver of the vehicle, comprising:

a reflective mirror provided in the vehicle;

an LCD panel placed in a light path between the reflective mirror and eyes of the driver, and comprising one or two polarizing sheets, each having a polarization rate ranging from 50% to 95% in a visible light band, the LCD panel varying a light transmissivity thereof depending on a magnitude of voltage applied to the LCD panel, thus adjusting a quantity of light that reaches the driver after being reflected by the reflective mirror;

an incident light detecting unit detecting both brightness of the incident light transmitted from behind the vehicle to the LCD panel and brightness around the LCD panel, and calculating a difference value therebetween;

a voltage determination unit receiving the difference value calculated by the incident light detecting unit and determining the drive voltage depending on the difference value; and a voltage apply and supply unit to apply the drive voltage determined by the voltage determination unit to the LCD panel.

2. The smart mirror apparatus according to claim 1, wherein the LCD panel is attached to the reflective mirror using a transparent hardening agent.

3. The smart mirror apparatus according to claim 2, wherein a nonreflecting layer is applied on an outermost surface of the LCD panel opposite a surface attached to the reflective mirror.

4. The smart mirror apparatus according to claim 2, wherein the transparent hardening agent is a thermosetting resin or a UV-setting resin, and a refractive index of the transparent hardening agent in the visible light band is from 1.40 to 1.55.

5. The smart mirror apparatus according to claim 1, wherein the reflective mirror and the LCD panel are spaced apart from each other.

6. The smart mirror apparatus according to claim 5, wherein the reflective mirror is disposed outside the vehicle, and the LCD panel is disposed inside the vehicle.

7. The smart mirror apparatus according to claim 5, wherein a nonreflecting layer is applied to each of opposite outermost surfaces of the LCD panel.

8. The smart mirror apparatus according to claim 5, wherein the reflective mirror and the LCD panel are configured such that the light transmitted from behind the vehicle is directly reflected by the reflective mirror, passes through the LCD panel, and reaches the driver.

9. The smart mirror apparatus according to claim 1, wherein a liquid crystal layer constituting the LCD panel is formed according to a TN mode, an ECB mode or a VA mode.

10. The smart mirror apparatus according to claim 1, wherein each polarizing sheet has a constant polarization rate and light transmissivity throughout an entire visible light wavelength band.

11. The smart mirror apparatus according to claim 1, wherein each polarizing sheet comprises a color polarizing sheet, a polarization rate or light transmissivity of which varies depending on a visible light wavelength.

12. The smart mirror apparatus according to claim 1, wherein the reflective mirror is formed by applying aluminum or chrome on an outer surface of a plastic or glass substrate such that a metal film is formed on the substrate.

13. The smart mirror apparatus according to claim 1, wherein the incident light detecting unit comprises:
a plurality of semiconductor light sensors provided at front and rear sides of the vehicle.

14. The smart mirror apparatus according to claim 1, wherein the power supply unit comprises a power source of the vehicle, a primary battery, a secondary battery or a solar battery.

* * * * *